US010161458B2

(12) United States Patent
Ishikawa et al.

(10) Patent No.: US 10,161,458 B2
(45) Date of Patent: Dec. 25, 2018

(54) STRUCTURE FOR COUPLING ROTARY ACTUATOR TO DRIVEN BODY

(71) Applicants: Toshiyuki Ishikawa, Nihonmatsu (JP); Masayuki Motoyanagi, Nihonmatsu (JP)

(72) Inventors: Toshiyuki Ishikawa, Nihonmatsu (JP); Masayuki Motoyanagi, Nihonmatsu (JP)

(73) Assignee: Oki Micro Engineering Company Limited, Fukushima (JP)

(*) Notice: Subject to any disclaimer, the term of this patent is extended or adjusted under 35 U.S.C. 154(b) by 782 days.

(21) Appl. No.: 14/771,581

(22) PCT Filed: Mar. 4, 2013

(86) PCT No.: PCT/JP2013/055829
§ 371 (c)(1),
(2) Date: Aug. 31, 2015

(87) PCT Pub. No.: WO2014/136174
PCT Pub. Date: Sep. 12, 2014

(65) Prior Publication Data
US 2016/0017928 A1    Jan. 21, 2016

(51) Int. Cl.
*F16D 1/108*     (2006.01)
*F16D 1/116*     (2006.01)
(Continued)

(52) U.S. Cl.
CPC .............. *F16D 1/116* (2013.01); *B65H 1/00* (2013.01); *B65H 3/06* (2013.01); *F16D 1/108* (2013.01); *H02K 5/00* (2013.01); *H02K 7/003* (2013.01); *F16D 2300/12* (2013.01)

(58) Field of Classification Search
CPC . F16D 1/00; F16D 1/0876; F16D 1/08; F16D 1/04; F16D 1/05; F16D 1/108;
(Continued)

(56) References Cited

U.S. PATENT DOCUMENTS 5,006,007 A * 4/1991 Fischer ................ F16D 1/0852
403/290
6,261,182 B1 * 7/2001 Chino ...................... F16D 1/06
403/306
(Continued)

FOREIGN PATENT DOCUMENTS

JP    H11-311260    11/1999
JP    2007-040351    2/2007

*Primary Examiner* — Daniel J Wiley
(74) *Attorney, Agent, or Firm* — Muramatsu & Associates

(57) ABSTRACT

To provide a structure for coupling a rotary actuator to a driven body whereby vibration and noise are reduced and assembly, disassembly, and maintenance after attachment to another device are made easy. This structure comprises the following: support parts laid out opposite a frame; a driven body positioned between said support parts; a shaft that holds said driven body and acts as a rotary shaft; and a rotary actuator coupled to said shaft. One end of the shaft is rotatably supported by one of the support parts, and the other end of the shaft is supported by being coupled to the rotary actuator through the opposing frame by being fitted into a tubular recess formed in the output shaft of the rotary actuator. A protrusion that is formed on the rotary actuator and cushioned in the direction of rotation is fitted into an engagement hole in the frame so as to affix the rotary actuator to the frame.

5 Claims, 5 Drawing Sheets

(51) Int. Cl.
  *H02K 5/00* (2006.01)
  *H02K 7/00* (2006.01)
  *B65H 1/00* (2006.01)
  *B65H 3/06* (2006.01)

(58) Field of Classification Search
  CPC ........ F16D 1/06; F16D 1/0882; Y10T 403/55; Y10T 403/557; Y10T 403/559; Y10T 403/5761; Y10T 403/7018–403/7024
  See application file for complete search history.

(56) References Cited

U.S. PATENT DOCUMENTS

| | | | | |
|---|---|---|---|---|
| 6,293,022 B1 * | 9/2001 | Chino | ................ | B62D 15/023 33/1 PT |
| 6,413,006 B1 * | 7/2002 | Neugart | ................ | F16D 1/0864 403/290 |
| 6,467,853 B1 * | 10/2002 | Swartzendruber | ........ | F16D 1/08 301/111.04 |
| 6,494,471 B2 * | 12/2002 | Lukac | ................... | A01B 51/026 280/93.5 |
| 6,824,471 B2 * | 11/2004 | Kamenov | ............. | F04D 13/021 403/13 |
| 6,951,145 B2 * | 10/2005 | Kilmartin | ............ | B60G 17/019 73/862.333 |
| 7,281,888 B1 * | 10/2007 | Kaiser | ................. | B23B 31/1076 279/83 |
| 7,543,831 B2 * | 6/2009 | Pope | .................... | B62D 15/023 280/93.5 |
| 2008/0178698 A1 * | 7/2008 | Tanaka | .................. | F16D 1/0876 74/467 |
| 2014/0154005 A1 * | 6/2014 | Nishibe | ..................... | F16D 1/04 403/356 |
| 2015/0052883 A1 * | 2/2015 | West | ........................ | F02B 63/06 60/325 |

* cited by examiner

STRUCTURE FOR COUPLING ROTARY ACTUATOR TO DRIVEN BODY

This application is a national stage of International Application No. PCT/JP2013/055829 filed Mar. 4, 2013, the entire contents of which are incorporated herein by reference.

TECHNICAL FIELD

The present invention relates to an arrangement of a rotary actuator and driving force transmission, and more particularly to a coupling structure of the rotary actuator and a driven body.

BACKGROUND OF THE INVENTION

Conventionally, a coupling (shaft coupling) which is a machine element has been used for coupling an output shaft of a rotary actuator that makes a rotary reciprocating movement (swing) at a constant angle with a driven body having a shaft.

For example, as shown in FIGS. 5(A) and 5(B), when a driven member 4 is arranged between frames f oppositely placed, the coupling is so structured that one end of the shaft s for holding the driven body 4 is rotatably supported by a bearing b at one of the frames f. The other end of the shaft is coupled by a coupling c to be connected to an output shaft a1 of a rotary actuator a attached to the other one of the frames f. The rotary actuator a is engaged with the frame f by a recess a2 having an anti-vibration rubber, thereby preventing rotation of the entire rotary actuator a as well as suppressing occurrences of vibration.

For the coupling described above, in addition to the cylindrical shape of a general open-ended coupling (hereinafter referred to as "universal coupling"), there are a metal plate spring type, a metal slit type, a resin portion rose type, and a so-called flexible coupling type described in Patent Document 1 which combines a groove and an elastic member. Moreover, there is a magnetic coupling type for coupling a driven body and an output shaft in a non-contact manner such as shown in Patent Document 2. The flexible coupling and the magnetic coupling noted above have the advantage that they can absorb misalignment between the axes of the coupling.

PRIOR ART LITERATURE

Patent Documents

Patent Document 1: Japanese Patent Laid-Open Publication No. 2007-40351 (page 3-5, FIG. 1)
Patent Document 2: Japanese Patent Laid-Open Publication No. H11-311260 (page 4-5, FIGS. 1 and 4)

SUMMARY OF THE INVENTION

Problems to be Solved by the Invention

In the coupling structure where the rotary actuator using the universal coupling is coupled to the driven body, positional misalignment occurs in the mechanical coupling of the shaft of the driven body and the output shaft of the rotary actuator. Therefore, adjustment at the time of assembling is required, and further, there arises a problem that "chattering" to the driven body, and "noise" to the rotary actuator are generated by the vibration at the time of driving.

The coupling structures using the "flexible coupling" of Patent Document 1 or the "magnetic coupling" of Patent Document 2, have the advantage that "chattering" or "noise" described above can be reduced or eliminated since it is possible to absorb the misalignment between the axes of the coupling. Further, when using the magnetic coupling, there is an advantage that abrasion of the coupling portion can be eliminated due to the non-contact coupling. On the other hand, there arises a problem that the overall structure becomes complicated since the axial length becomes longer than the universal coupling and a dedicated magnetic circuit is required.

In the first place, in the above-described structure where the coupling itself is used as a coupling element, maintenance and replacement operation of the rotary actuator becomes complicated. For example, when the rotary actuator is to be replaced, it was necessary to uncouple the coupling portion and make adjustment since the output shaft and the driven body are separated. However, when the arranged location of the driven body and the coupling is small in space, the overall structure need be disassembled since working in the small space is difficult.

Moreover, the axial length of the overall structure becomes long in order to secure an enough space to arrange the coupling between the frames. Accordingly, other devices to which this structure is adopted, for example, ATM equipment (automatic teller apparatus), printer, copier, facsimile apparatus or the like, can become larger, thereby limiting application of the structure.

The present invention has been made to solve the above problems, and it is an object to provide a coupling structure of the rotary actuator and the driven body, which reduces vibration and noise, facilitates assembly and disassembly operations, and further facilitates maintenance works after implementation to other apparatus.

Means for Solving the Problems

In order to realize the above-mentioned object, the structure for coupling (hereinafter referred to as "coupling structure") the rotary actuator and the driven body according to the present invention is configured as follows.

The coupling structure is comprised of: support portions oppositely laid to frames; a driven member disposed between the support portions; a shaft that holds the driven body and operates as a rotating shaft; a rotary actuator coupled to the shaft. One end of the shaft is rotatably supported by one of the support portions, and the other end of the shaft is coupled to the rotary actuator by extending through an opposite frame.

As long as the support portions oppositely laid to the frames are provided, the frame may be in the form of any of a plate-like frame shape of a collar shape, and may be a frame of another apparatus for assembling the coupling structure. Further, as to positioning the rotary actuator to the frame, a boss can preferably formed in a periphery of the output shaft, which is fitted to a through-hole formed in the frame for positioning.

The coupling between the shaft and the rotary actuator is characterized in that the other end of the shaft is fitted and fixed into a tubular recess formed at the output shaft of the rotary actuator.

In this coupling, in order to ensure transmission of a driving force to the shaft by the rotary actuator, it is structured so that engagement is established for at least to a rotational direction. More specifically, a D-cut surface is formed on the shaft and the tubular recess of the rotary actuator is fitted to the shape of D-cut surface. Further, the fitting portion between the shaft and the tubular recess may be arranged with keys and key grooves.

Moreover, it is characterized in that fixation of the rotary actuator and the frame is made by fitting one or more protrusions formed on either the rotary actuator or the frame to an engagement opening formed on either the rotary actuator or the frame. Then, the fitting of the protrusion and the engagement opening is characterized as the fitting that at least provides buffers to the rotational direction. Here, as a means of the buffers, an anti-vibration elastic body such as anti-vibration rubber wrapping around the protrusion may be used.

By the above-described fixational structure, not only the rotation of the rotary actuator at the time of driving can be prevented, but also propagation of vibration can be suppressed from the rotary actuator to the frame by virtue of the buffer means.

Effect of the Invention

Owing to the above structure, the present coupling structure has the following advantages.

The coupling between the rotary actuator and the shaft that holds the driven body is performed at the outside of the frames having oppositely laid support portions. More specifically, the other end of the shaft extends from the frame of opposite side to the rotary actuator, and is coupled to the tubular recess formed at the output shaft of the rotary actuator. Further, the fixation of the rotary actuator to the frame is achieved by fitting the protrusion formed on one side to the engagement opening formed on the other side.

With the above configuration, the attachment/detachment operation of the rotary actuator can be made at the outside of the frame. As a result, after the coupling structure is assembled to other apparatus, the rotary actuator can be individually maintained or replaced without disassembling the whole of the coupling structure or a part of other apparatus, that is, without changing positional relationship among the frames and the driven body connected to the shaft.

Moreover, it is possible to omit a coupling for connecting the output shaft of the rotary actuator and the driven body. By omission of the coupling, positional misalignment between the axises in the conventional art can be avoided, and assembly and disassembly can be facilitated due to the simplicity of the overall structure. For example, a positioning (parameter 1) can be made for a frame and a machine element (sorter and sheet guide) of other device that arranges a frame, then a positioning (parameter 2) can be made from the outside of the frame for only the rotary actuator for mounting. Conventionally, for coupling by an intermediary coupling structure, the parameter 1 and the parameter 2 had to be simultaneously set for positioning. In the present coupling structure, however, a sequential operation is possible such that the first setting operation for adjustment of the parameter 1 is carried out and then the second setting operation for adjustment of the parameter 2 is carried out, thereby individually and sequentially carrying out the setting accurately and quickly.

Moreover, it becomes possible to suppress the occurrence of vibration and noise caused by the positional misalignment between the shafts involving the coupling. Further, the entire structure can be made compact since the distance between the rotary actuator and the driven body can be reduced, which expands the scope of applicable devices to which the present coupling structure can be implemented, and can reduce the size of the entire device.

EMBODIMENTS OF THE INVENTION

Figure 1:
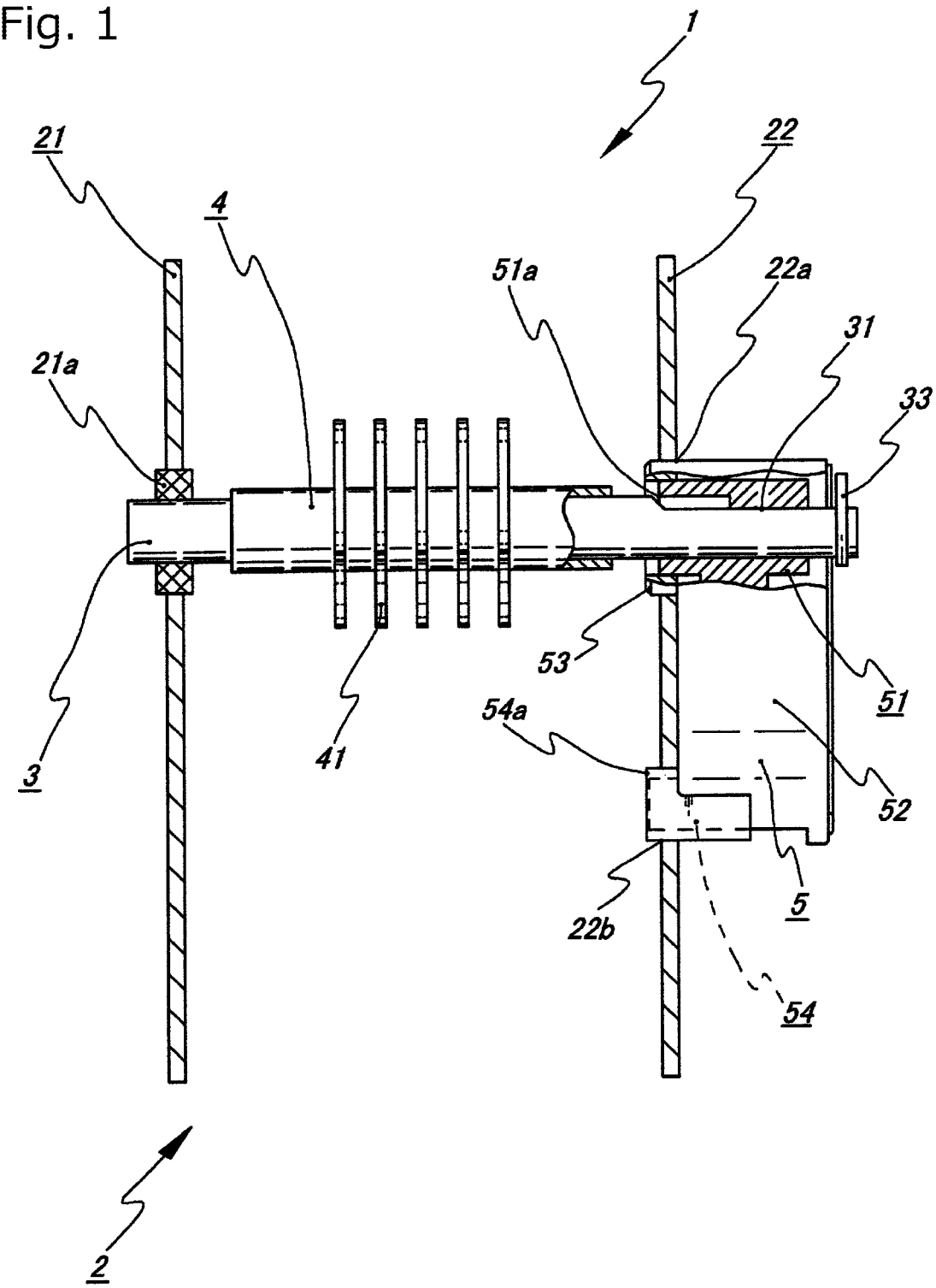
FIG. 1 is a partially cut-out longitudinal cross-sectional view showing the coupling structure of the present invention.
Figure 2:
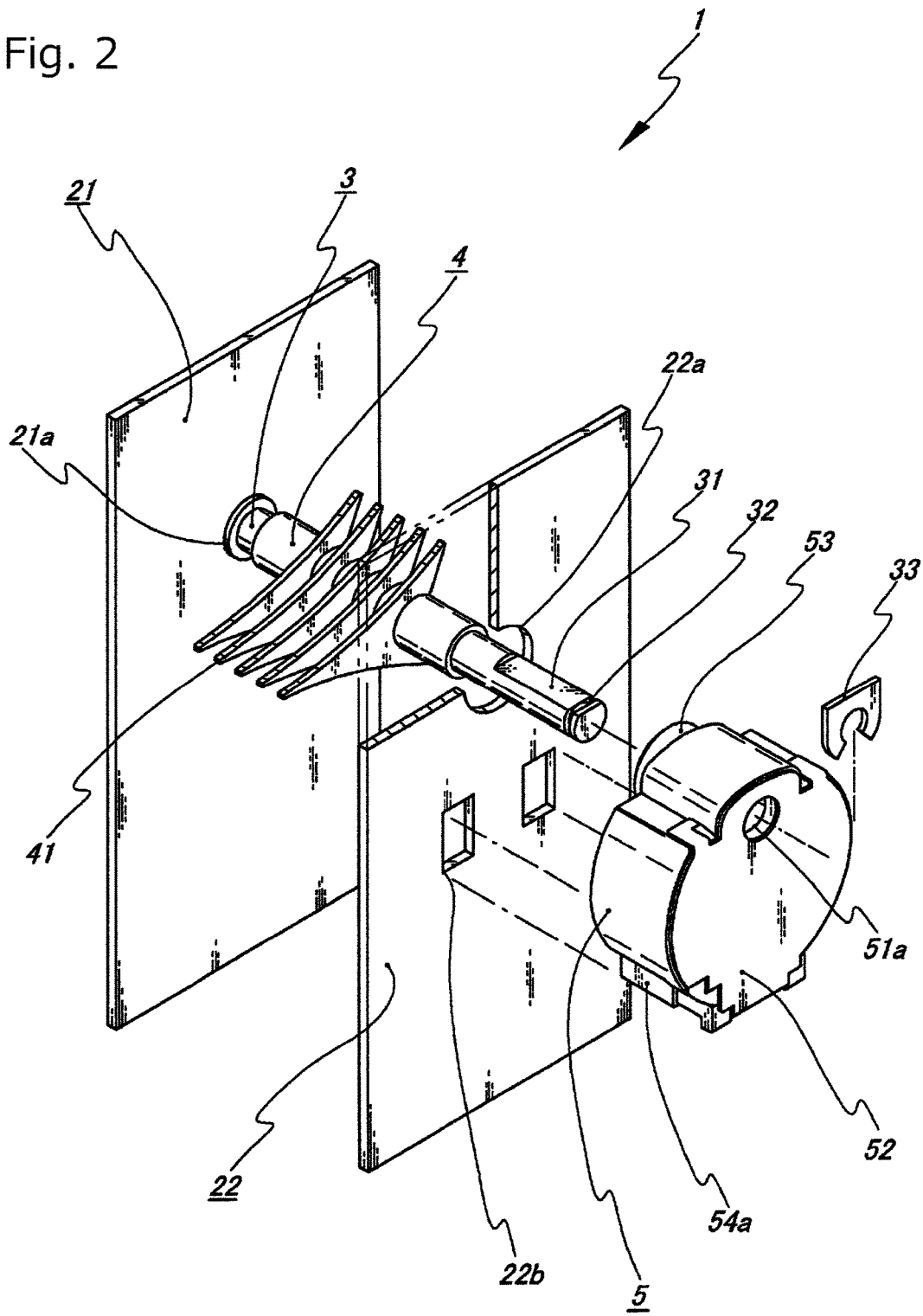
FIG. 2 is a partially cut-out perspective view showing the assembled coupling structure of the present invention.
Figure 3:
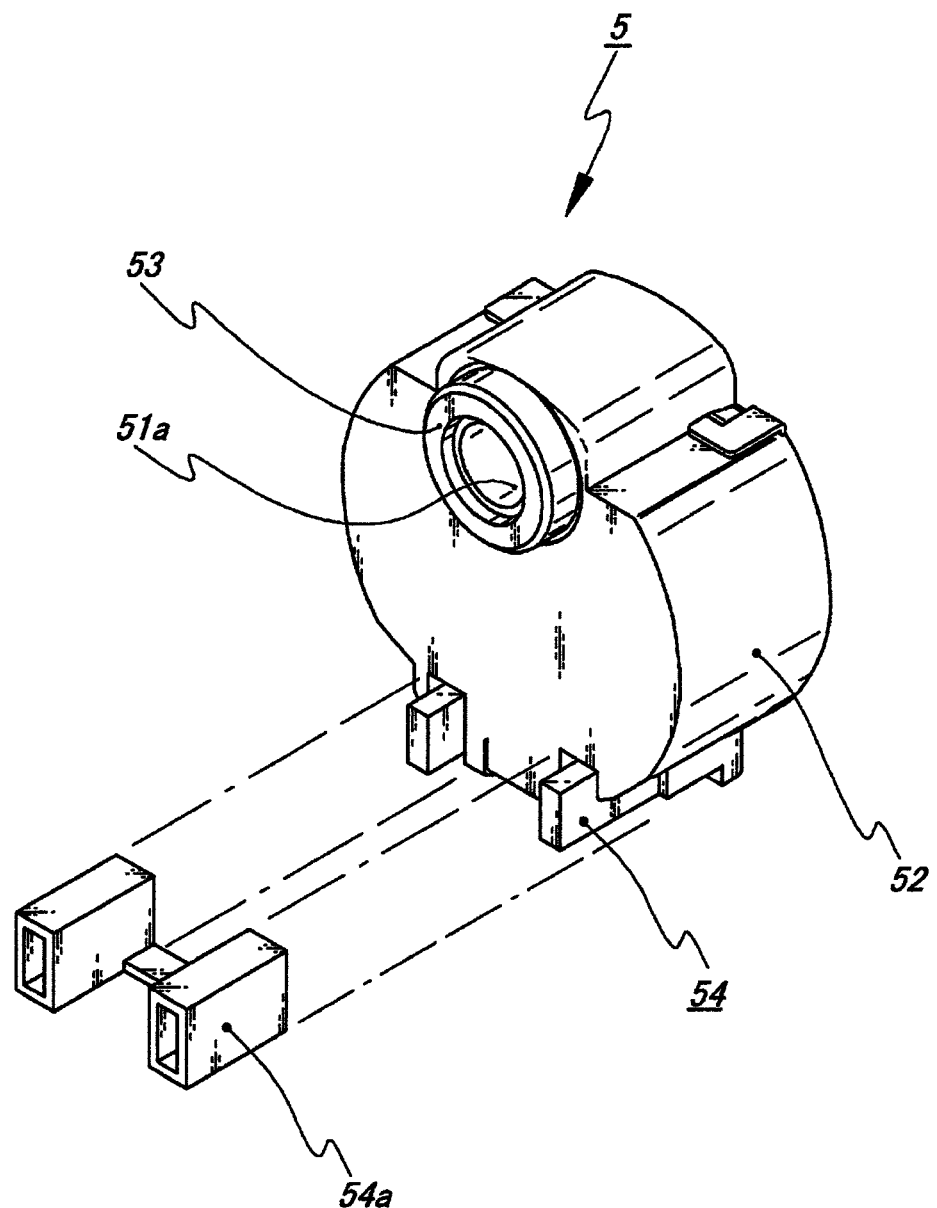
FIG. 3 is a perspective view of the rotary actuator of the assembled coupling structure of the present invention.

Hereinafter, embodiments of the present coupling structure will be described in detail with reference to the drawings.

The present coupling structure 1 is configured such that a shaft 3 that operates as a rotating shaft and holds a driven body 4 to be capable of swinging (rotational reciprocating) and is arranged to frames 2 having oppositely laid support portions, and a driving force of a rotary actuator 5 fixed to the outside of one of the frames 2 is transmitted to the shaft 3.

Present coupling structure 1 can be used for a driving unit of a driven body 4 that operates as a guide part to sort flowing banknotes and sheet materials, for example, in an ATM device, a printer apparatus, or the like.

The frames 2 form a housing that holds the coupling structure 1 and are arranged to face each other in a predetermined distance. It should be noted that, in the drawings, only planer bodies of the frames 2 constituting oppositely laid support portions are shown and the remaining portions are omitted. While the frames 2 are components of the coupling structure 1, a component or a bracket of other instruments of ATM equipment, printer apparatus and the like to which the coupling structure of the present invention is arranged may also be used as the frames.

An oppositely laid one-side frame 21 is arranged with a bearing 21a that rotatably supports one end of the shaft 3. Other-side frame 22 is formed with a through-hole 22a through which the other end of the shaft 3 penetrates to the outside of the frame. Below the through-hole 22a, two engaging openings 22b are established in parallel to which protrusions 54 are fitted to function as fastening means between the frame 22 and the rotary actuator 5 as will be described later.

The shaft 3 is disposed between the support portions of the frames 2. One end of the shaft 3 is rotatably supported by the bearing 21a of the one-side frame 21 as described above, and the other end extends to the outside through the through-hole 22a of the other-side frame 22 facing each other. Further, the extending portion of the shaft 3 to the outside of the frame 22 is formed, at its end, a D-cut surface 31 as well as to have a groove 32 with which a retaining ring 33 engages.

The driven body 4 is fixed to a portion of the shaft 3 located between the support portions of the frames 2. The driven body 4 has a tubular part that forms five flaps 41 at the outer peripheral portion, and the tubular part is fixed around the shaft 3. With regard to the driven body 4, the shape and the number of the flaps 41 may be changed. The flaps 41 may be fixed separately to the outer periphery and the driven body 4 may be integrally formed with the shaft 3. Further, the driven body 4 is not limited to the form of this embodiment, as long as the arrangement position to the shaft 3 falls within the supporting portions between the frames 2, the form and the fixing method to the shaft 3 may be changed accordingly based on the requirements of the other devices (ATM device, printer device).

The end portion of the shaft 3 extending from the other-side frame 22 to the outside is fitted and fixed into a tubular recess 51a formed at the output shaft of the rotary actuator 5. A groove 32 formed at the end of the shaft 3 exposed to the outside of the rotary actuator 5 is fitted with the retaining ring 33 to prevent the shaft 3 from coming off.

The rotary actuator 5 makes a coupling by storing the end portion of the shaft 3 extending from the other-side frame 22 to the outside. A boss 53 formed around the tubular recess 51a is fitted to the through-hole 22a of the frame 22. Thus, one side surface of a case 52 of the rotary actuator 5 is mounted in contact with the other-side frame 22 at the outside surface (the side counter to the driven body).

The rotary actuator 5 performs alignment (centering) of the output shaft and the shaft 3 upon coupling of the tubular recess 51a and the shaft 3. On the other hand, by fitting the boss 53 to the through-hole 22a, the whole of the rotary actuator is positioned with respect to the frame 22.

Below the rotary actuator 5 is formed two protrusions 54 disposed in parallel, which fit into the engaging openings 22b of the frame 22. An anti-vibration rubber 54a made of elastic material as a buffer means is provided around the protrusions 54. The anti-vibration rubber 54a has a shape of coupled cylinder-like shape to be fitted to the two protrusions 54. By the anti-vibration rubber 54a, the rotary actuator 5 is prevented from co-rotation with the shaft 3 during driving, and propagation of vibration to the frame 22 is suppressed.

The tubular recess 51a of the rotary actuator 5 is formed through the portion of the output axis of a rotor 51, and the driving force is transmitted to the inner shaft 3. In addition, the tubular recess 51a is made to protrude inside so as to follow the D-cut face 31 of the shaft 3, thereby securing transmission of the driving force.

Except for transmitting a driving force via the tubular recess 51a formed in the rotor 51, the rotary actuator 5 is comparable to that of the existing actuator, which constitutes the rotor 51 arranged in the case 52, a permanent magnet (not shown) arranged to the rotor 51, a stator (not shown) comprising magnet coil for swinging the rotor 51. For this reason, a detailed description of the internal structure of the rotary actuator 5 is omitted.

In the coupling structure 1 of the above configuration, the coupling of the driven body 4 is made in a manner that the rotary actuator 5 directly supports the shaft 3 that is fixed with the driven body 4. Therefore, the coupling for shaft connection can be omitted, and as a result, generation of vibration and noise due to the misalignment by the intermediary coupling of the shafts between the driven body side and the rotary actuator side can be suppressed, and the axis length of the entire structure can be reduced.

In addition, in the present coupling structure 1, the fitting state of the rotary actuator 5 and the shaft 3 can be released, and the boss 53 and the protrusion 54 can be pulled out from the through-hole 22a and the notch 22b of the frame 22. Then, the rotary actuator 5 can be individually retracted to an outer direction of the frame 22 (the direction opposite to the driven body). Thus, even after the coupling structure 1 is assembled to other apparatus, maintenance and replacement operations of the rotary actuator 5 can be facilitated.

Other Embodiments

Figure 4:
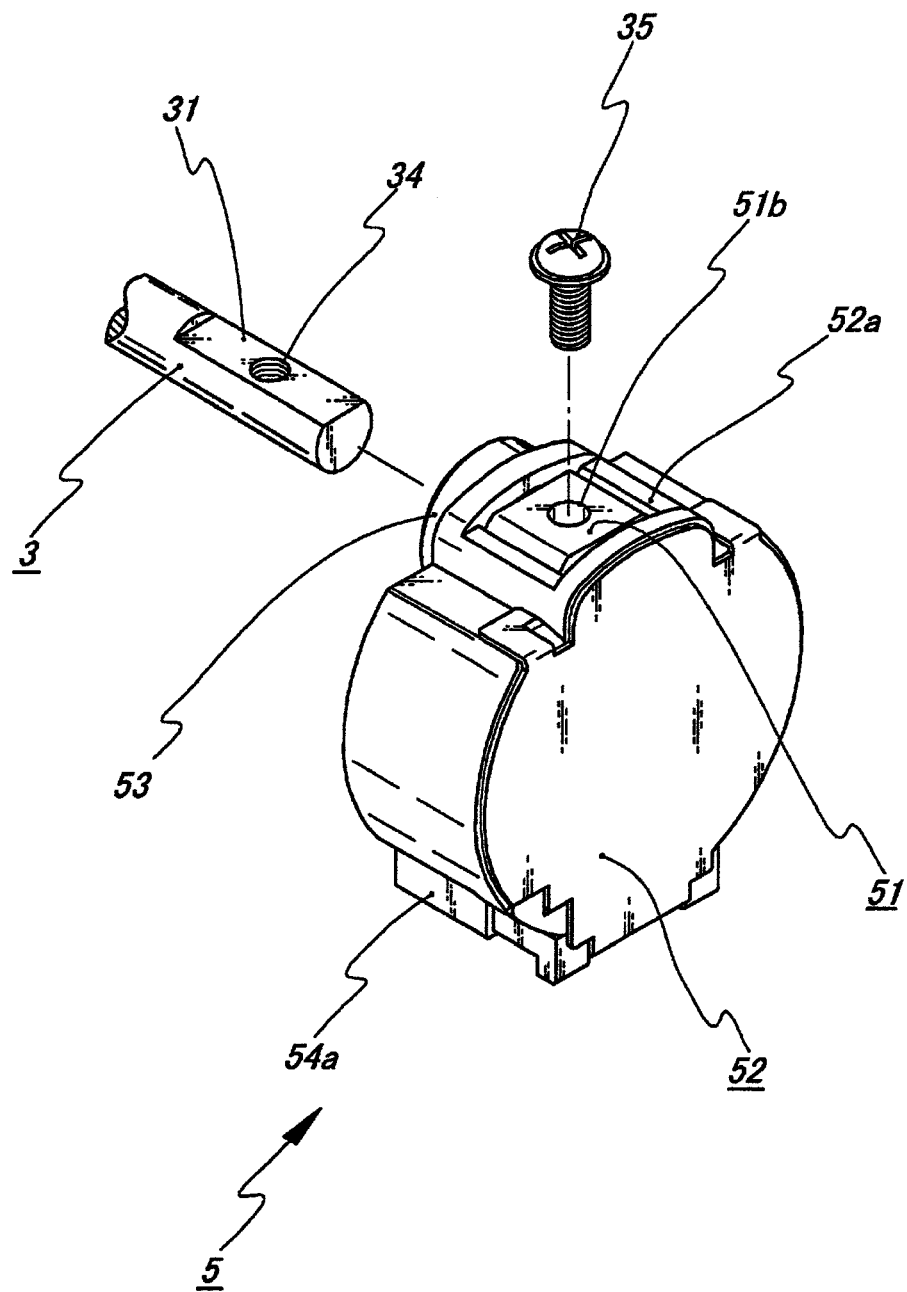
FIG. 4 is a partially cut-out perspective view illustrating another embodiment of a shaft and rotary actuator of the assembled coupling structure of the present invention.

In the coupling structure 1 of the above embodiment, the retaining ring 33 is used to prevent the shaft 3 and the tubular recess 51a of the rotor 51 from coming off. However, the shaft 3 and the rotor 51 may be fixed with a screw 35. That is, as shown in FIG. 4, a screw hole 34 is formed on the D-cut surface 31 of the shaft 3 and a screw hole 51b is formed on the rotor 51, and further an opening 52a or a notch may be formed on a part of the case 52 to expose the screw fastening portion of the rotor 51.

Figure 5:
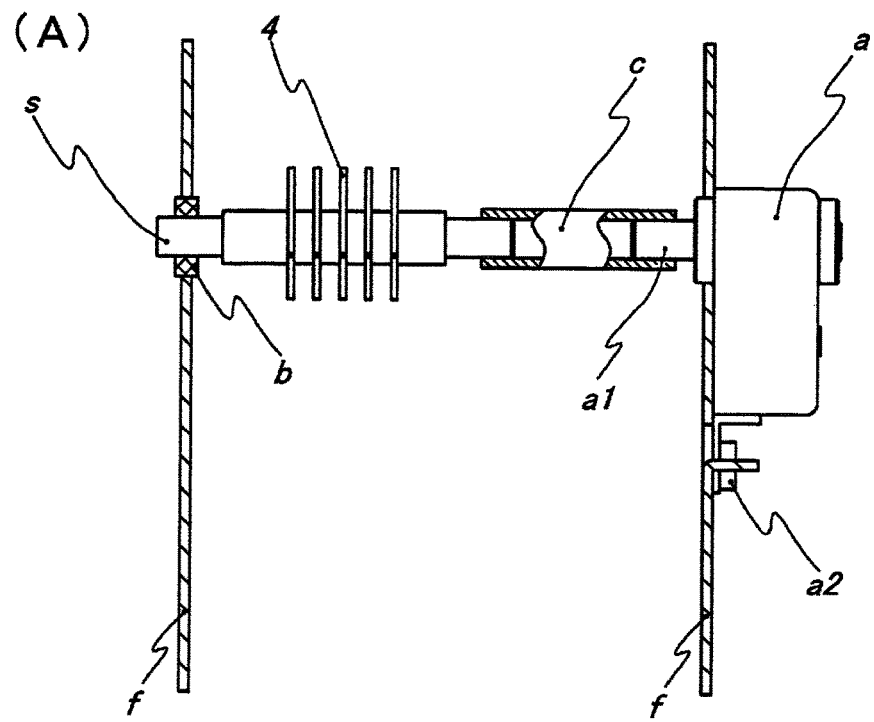
FIG. 5(A) is a longitudinal cross-sectional view and FIG. 5(B) is a perspective view each showing an assembled coupling of a rotary actuator and a driven body in the conventional technology.
Figure 5:
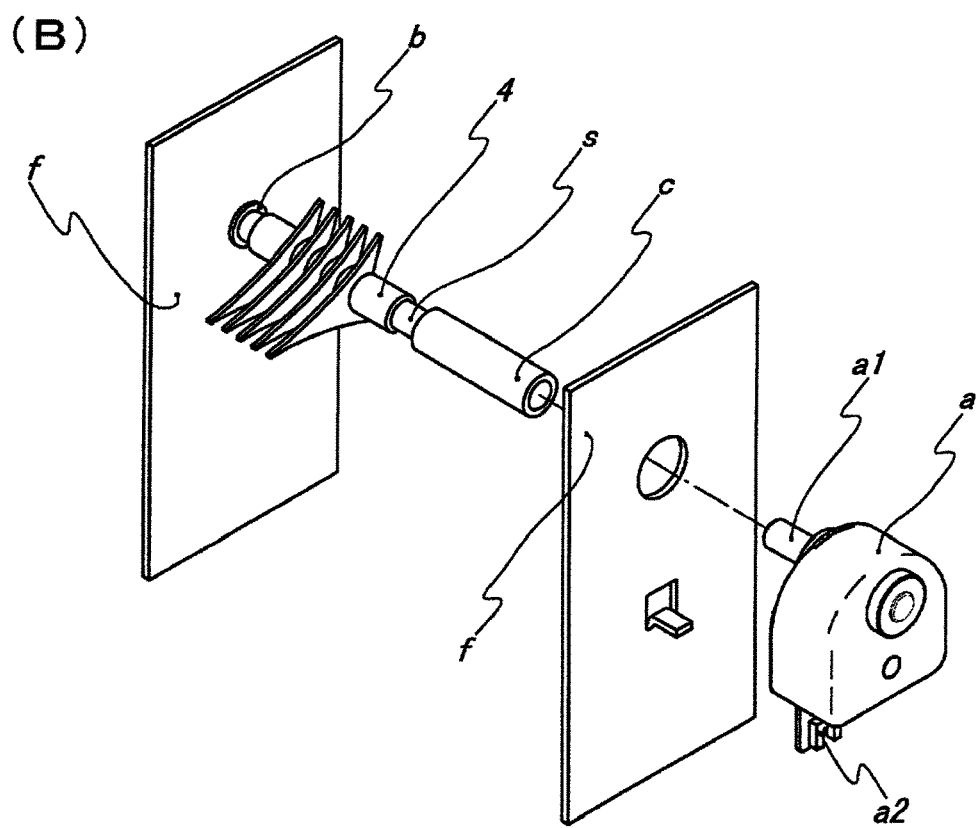

Moreover, the present coupling structure 1 is not limited to the above embodiment for the fixing of the rotary actuator 5 and the frame 22. The arrangement positions and number of the protrusions 54 and the through-hole 22a may be changed as appropriate. For example, a protrusion may be formed on a frame side, which may be used for fitting or engaging with a notch or a recess formed on the rotary actuator side (the structure of the conventional example shown in FIG. 5).

With regard to the arrangement of the buffer means, it is not limited to the form where the anti-vibration rubber 54a wraps around the protrusion 54, for example, the elastic body may be disposed only at the periphery of the engaging openings 22b of the frames 2 or at the rotational direction side (horizontal direction in the drawings).

DESCRIPTION OF REFERENCE SYMBOLS 1 coupling structure
2 frames
   21 one-side frame
   21a bearing
   22 other-side frame
   22a through-hole
   22b engaging opening
3 shaft
   31 D-cut surface
   32 groove
   33 retaining ring
   34 screw hole
   35 screw
4 driven body
   41 flaps
5 rotary actuator
   51 rotor
   51a tubular recess
   51b screw hole
   52 case
   52a opening
   53 boss
   54 protrusion
   54a anti-vibration rubber
a conventional rotary actuator
   a1 output shaft
   a2 recess
b bearing
c coupling
f frame
s shaft

What is claimed is:

1. A coupling structure of a rotary actuator and a driven body, characterized in having:
   support portions oppositely laid into a frame;
   a driven body disposed between the support portions;
   a shaft holding the driven body and operates as a rotation axis thereof; and
   a rotary actuator coupled to the shaft;
   wherein one end of the shaft is rotatably supported by one of the support portions and the other end of the shaft penetrates an opposing frame and extends to be coupled to the rotary actuator.

2. The coupling structure of a rotary actuator and a driven body of claim 1, further characterized in that a tubular recess is formed at an output shaft of the rotary actuator, and the other end of the shaft is fitted to the tubular recess, thereby establishing engagement at least to a rotational direction.

3. The coupling structure of a rotary actuator and a driven body of claim 1, further characterized in that the rotary actuator coupled to the shaft is supported by being fixed to the frame.

4. The coupling structure of a rotary actuator and a driven body of claim 3, further characterized in that fixation of the rotary actuator to the frame is configured by an engagement between:
   a protrusion formed on one of the rotary actuator and a support portion of the frame; and
   an engaging opening formed on the other of the rotary actuator and the support portion of the frame.

5. The coupling structure of a rotary actuator and a driven body of claim 4, further characterized in that the engagement between the protrusion and the engaging opening is provided with a buffer at least to a rotational direction.

* * * * *